(12) United States Patent
Kalliola et al.

(10) Patent No.: US 11,165,829 B2
(45) Date of Patent: Nov. 2, 2021

(54) VIRTUALIZED NETWORK FUNCTION SECURITY WRAPPING ORCHESTRATION IN THE CLOUD ENVIRONMENT

(71) Applicant: Nokia Technologies Oy, Espoo (FI)

(72) Inventors: Aapo Kalliola, Espoo (FI); Yoan Jean Claude Miche, Espoo (FI); Ian Justin Oliver, Soderkulla (FI)

(73) Assignee: Nokia Technologies Oy, Espoo (FI)

( * ) Notice: Subject to any disclaimer, the term of this patent is extended or adjusted under 35 U.S.C. 154(b) by 181 days.

(21) Appl. No.: 16/340,856

(22) PCT Filed: Oct. 11, 2016

(86) PCT No.: PCT/CN2016/101790
§ 371 (c)(1),
(2) Date: Apr. 10, 2019

(87) PCT Pub. No.: WO2018/068202
PCT Pub. Date: Apr. 19, 2018

(65) Prior Publication Data
US 2019/0245889 A1  Aug. 8, 2019

(51) Int. Cl.
*G06F 17/00* (2019.01)
*H04L 29/06* (2006.01)
(Continued)

(52) U.S. Cl.
CPC .......... *H04L 63/20* (2013.01); *G06F 9/45533* (2013.01); *G06F 21/53* (2013.01);
(Continued)

(58) Field of Classification Search
CPC .......... H04L 63/20; H04L 41/12; H04L 41/28; H04L 63/0272; H04L 67/10; H04L 67/12;
(Continued)

(56) References Cited

U.S. PATENT DOCUMENTS 9,578,664 B1 * 2/2017 Paczkowski .......... H04W 76/12
9,749,294 B1 * 8/2017 Marquardt .......... H04L 63/0209
(Continued)

FOREIGN PATENT DOCUMENTS

CN   105577637 A   5/2016
CN   105847237 A   8/2016
(Continued)

OTHER PUBLICATIONS

"Network Functions Virtualisation (NFV); NFV Security: Security and Trust Guidance," ETSI GS NFV-SEC 003 v1.1.1, pp. 1-57, (Dec. 2014).
(Continued)

*Primary Examiner* — Gary S Gracia
(74) *Attorney, Agent, or Firm* — Fay Sharpe LLP

(57) ABSTRACT

A method for protection of virtualized network functions may comprise: obtaining security orchestration information for one or more virtualized network functions; determining network interfaces relevant to protection of the one or more virtualized network functions based at least in part on network topology information, in response to the security orchestration information; and issuing a security instruction for the protection of the one or more virtualized network functions, according to the determined network interfaces.

20 Claims, 2 Drawing Sheets

(51) Int. Cl.
*H04L 12/24* (2006.01)
*G06F 9/455* (2018.01)
*H04L 29/08* (2006.01)
*G06F 21/53* (2013.01)

(52) U.S. Cl.
CPC .............. *H04L 41/12* (2013.01); *H04L 41/28* (2013.01); *H04L 63/0272* (2013.01); *H04L 67/10* (2013.01); *H04L 67/12* (2013.01); *G06F 2009/45587* (2013.01); *G06F 2009/45595* (2013.01)

(58) Field of Classification Search
CPC . G06F 2009/45587; G06F 2009/45595; G06F 21/53; G06F 9/45533
See application file for complete search history.

(56) References Cited

U.S. PATENT DOCUMENTS

| | | | | |
|---|---|---|---|---|
| 9,811,686 | B1* | 11/2017 | Marquardt | G06Q 30/04 |
| 2015/0295750 | A1* | 10/2015 | Blanco | G06F 9/50 |
| | | | | 714/4.2 |
| 2015/0333979 | A1* | 11/2015 | Schwengler | G06Q 30/02 |
| | | | | 709/226 |
| 2015/0358248 | A1* | 12/2015 | Saha | H04L 41/5096 |
| | | | | 709/226 |
| 2016/0043944 | A1* | 2/2016 | Felstaine | H04L 47/12 |
| | | | | 370/389 |
| 2016/0127333 | A1* | 5/2016 | Sood | H04L 63/0272 |
| | | | | 380/44 |
| 2016/0180063 | A1* | 6/2016 | Bhandaru | G06F 21/105 |
| | | | | 726/26 |
| 2016/0182567 | A1* | 6/2016 | Sood | H04L 63/0272 |
| | | | | 726/1 |
| 2016/0226913 | A1* | 8/2016 | Sood | G06F 21/577 |
| 2016/0330083 | A1* | 11/2016 | Djukic | H04L 12/1492 |
| 2016/0337329 | A1* | 11/2016 | Sood | H04L 63/205 |
| 2016/0373474 | A1* | 12/2016 | Sood | H04L 63/062 |
| 2017/0019302 | A1* | 1/2017 | Lapiotis | H04L 41/145 |
| 2017/0094002 | A1* | 3/2017 | Kumar | H04L 49/70 |
| 2017/0123863 | A1* | 5/2017 | Erickson | G06F 9/54 |
| 2017/0141974 | A1* | 5/2017 | Lahiri | H04L 43/028 |
| 2017/0168690 | A1* | 6/2017 | Kirk | G06F 16/90324 |
| 2017/0180273 | A1* | 6/2017 | Daly | H04L 69/324 |
| 2017/0289060 | A1* | 10/2017 | Aftab | H04L 41/5054 |

FOREIGN PATENT DOCUMENTS

| | | |
|---|---|---|
| WO | WO 2016/126347 A1 | 8/2016 |
| WO | WO 2016/128062 A1 | 8/2016 |

OTHER PUBLICATIONS

International Search Report for PCT/CN2016/101790 dated Jun. 28, 2017.

* cited by examiner

VIRTUALIZED NETWORK FUNCTION SECURITY WRAPPING ORCHESTRATION IN THE CLOUD ENVIRONMENT

FIELD OF THE INVENTION

The present disclosure generally relates to communication networks, and more specifically, relates to network security.

BACKGROUND

In a modern cloud environment, functions are performed by groups of single or interconnected virtual machines, thus forming Virtualized Network Functions (VNFs). While securing VNFs is generally recognized to be important, the actual security mechanisms remain somewhat underdeveloped at the moment. Securing VNFs is thus far an area in which the solutions are poorly integrated into the rest of the Network Function Virtualization Management and Orchestration (NFV MANO) infrastructure. This presents the issue where security solutions are more or less ad-hoc, requiring heavy operator interaction and a differing manner of operator interaction compared to the rest of the management and orchestration.

SUMMARY

The present description introduces a novel security solution for protection of VNFs in a network.

According to a first aspect of the present disclosure, there is provided a method comprising: obtaining security orchestration information for one or more VNFs; determining network interfaces relevant to protection of the one or more VNFs based at least in part on network topology information, in response to the security orchestration information; and issuing a security instruction for the protection of the one or more VNFs, according to the determined network interfaces.

According to a second aspect of the present disclosure, there is provided an apparatus comprising at least one processor and at least one memory comprising computer program code, the at least one memory and the computer program code configured to, with the at least one processor, cause the apparatus at least to: obtain security orchestration information for one or more VNFs; determine network interfaces relevant to protection of the one or more VNFs based at least in part on network topology information, in response to the security orchestration information; and issue a security instruction for the protection of the one or more VNFs, according to the determined network interfaces.

According to a third aspect of the present disclosure, there is provided a computer program product comprising a computer-readable medium bearing computer program codes embodied therein for use with a computer, the computer program codes comprising: code for obtaining security orchestration information for one or more VNFs; code for determining network interfaces relevant to protection of the one or more VNFs based at least in part on network topology information, in response to the security orchestration information; and code for issuing a security instruction for the protection of the one or more VNFs, according to the determined network interfaces.

According to a fourth aspect of the present disclosure, there is provided an apparatus comprising: obtaining means for obtaining security orchestration information for one or more VNFs; determining means for determining network interfaces relevant to protection of the one or more VNFs based at least in part on network topology information, in response to the security orchestration information; and issuing means for issuing a security instruction for the protection of the one or more VNFs, according to the determined network interfaces.

In accordance with an exemplary embodiment, the determined network interfaces may comprise at least one of: network interfaces at which protector VNFs need to be placed; and network interfaces from which protector VNFs need to be removed.

In accordance with an exemplary embodiment, the security orchestration information may comprise at least a security command for at least one of: activating protection of at least a first VNF of the one or more VNFs; and deactivating protection of at least a second VNF of the one or more VNFs.

In accordance with an exemplary embodiment, the protection of the first VNF may be activated by placing protector VNFs at the determined network interfaces for the first VNF. The protection of the second VNF may be deactivated by removing protector VNFs from the determined network interfaces for the second VNF.

In accordance with an exemplary embodiment, the one or more VNFs may comprise at least a group of topologically contiguous VNFs. For example, the protection of the group of topologically contiguous VNFs may be performed by wrapping the group of topologically contiguous VNFs with protector VNFs.

In accordance with an exemplary embodiment, the method according to the first aspect of the present disclosure may further comprise: verifying whether a security command in the security orchestration information is valid; and getting instruction information on implementing the valid security command.

In accordance with an exemplary embodiment, the security instruction may indicate at least one of: instantiating at least one protector VNF; inserting at least one instantiated protector VNF; terminating at least one instantiated protector VNF; and removing at least one protector VNF. Additionally or alternatively, the security instruction may comprise at least network routing related operation information.

In accordance with an exemplary embodiment, the method according to the first aspect of the present disclosure may further comprise: monitoring one or more protector VNFs instantiated for the protection of the one or more VNFs. Additionally or alternatively, the method according to the first aspect of the present disclosure may further comprise: receiving reporting information from the one or more protector VNFs.

Optionally, the method according to the first aspect of the present disclosure may further comprise: instructing the one or more protector VNFs to take actions, based at least in part on the received reporting information.

In accordance with an exemplary embodiment, the one or more VNFs may comprise at least a VNF aggregate formed by a first group of VNFs which are interdependent in their functionalities.

In accordance with an exemplary embodiment, the method according to the first aspect of the present disclosure may further comprise: monitoring a security violation of the VNF aggregate enclosed in a protection envelope which is formed by wrapping the first group of VNFs with protector VNFs; and managing preparation of a second group of VNFs to replace the VNF aggregate upon the monitored security violation.

In accordance with an exemplary embodiment, the method according to the first aspect of the present disclosure may further comprise: instantiating the second group of VNFs, in response to the monitored security violation; and replacing the VNF aggregate with the second group of instantiated VNFs.

In accordance with an exemplary embodiment, the method according to the first aspect of the present disclosure may further comprise: terminating the VNF aggregate, in response to the second group of instantiated VNFs taking the place of the VNF aggregate.

In accordance with an exemplary embodiment, the method according to the first aspect of the present disclosure may further comprise: analyzing the terminated VNF aggregate for creating preventative measures against the monitored security violation.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION OF THE INVENTION

The embodiments of the present disclosure are described in details with reference to the accompanying drawings. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Deploying traffic analyzer VNFs in a Software Defined Networking (SDN) network is a known flexible technique for traffic analysis. Suspicious traffic can then be directed to network-internal or external traffic scrubbing devices for more extensive analysis. Proprietary solutions exist in the same problem area, but are in many ways more restricted due to not being native to the cloud environment and lacking in certain features as listed below. For example, many SDN debugging tools are geared towards generic network troubleshooting. These solutions do not enable the orchestration for effective security protection of a group of VNFs. The security service insertion and the generic design pattern defined in the current solutions do not define an orchestration mechanism of the specifics of applicable template extensions. On the other hand, the VNF related templates systems do not provide a means to define security protector related functionality such as that required by the proposed orchestrator.

In comparison to the current solutions, methods, apparatus, and computer program products provided according to exemplary embodiments of the present disclosure can provide a novel and effective solution to secure VNFs in the existing NFV MANO structure. The security solution proposed in the present disclosure introduces a new component called Guardian Orchestrator (GOrch) along with its extensions to existing VNF instantiating templating systems and its interfaces to other orchestrator components such as Cloud Orchestrator (ClOrch) and Security Orchestrator (SecOrch).

Figure 1:
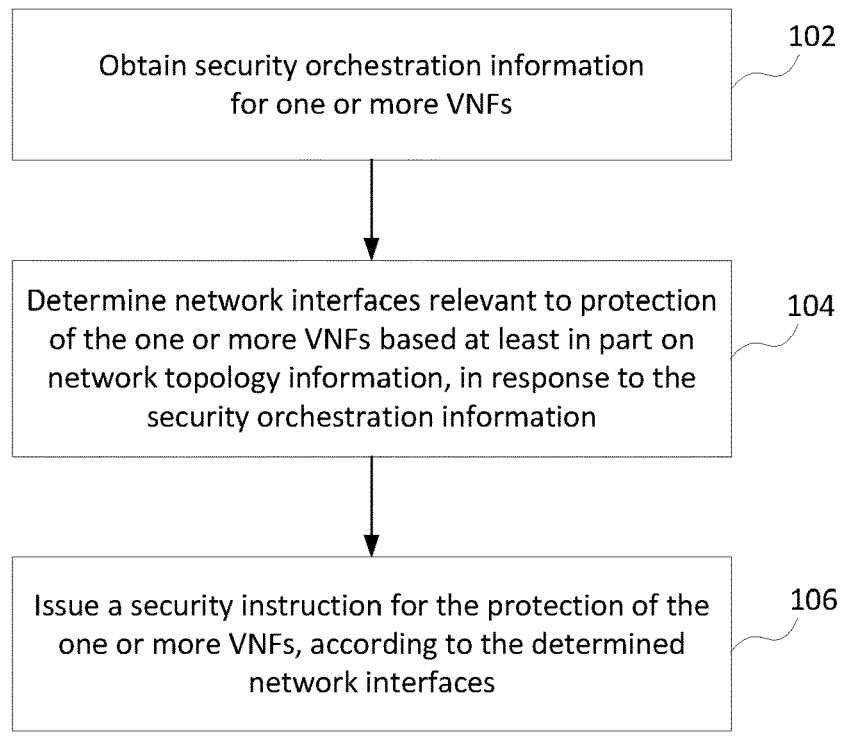
FIG. 1 is a flowchart illustrating a method for protection of VNFs in accordance with an embodiment of the present disclosure.

FIG. 1 is a flowchart illustrating a method for protection of VNFs in accordance with an embodiment of the present disclosure. The method illustrated in FIG. 1 may be performed, for example, at an orchestrator component such as GOrch. It will be realized that the proposed method may also be performed at one or more other network components which may be capable of playing the same or similar role as the GOrch.

According to the method illustrated in FIG. 1, security orchestration information may be obtained for one or more VNFs, as shown in block 102. For example, an orchestrator component such as SecOrch may provide the security orchestration information for the one or more VNFs to the GOrch. The security orchestration information may comprise at least a security command for at least one of: activating protection of at least a first VNF of the one or more VNFs, and deactivating protection of at least a second VNF of the one or more VNFs. The first VNF may refer to a VNF on which a "GUARD" command may need to perform, while the second VNF may refer to a VNF on which a "REMOVE GUARD" command may need to perform.

In response to the security orchestration information, network interfaces relevant to protection of the one or more VNFs may be determined based at least in part on network topology information, as shown in block 104. In an exemplary embodiment, the GOrch may verify whether a security command in the security orchestration information is valid, and get some instruction information on implementing the valid security command. For example, a template database may be checked in order to verify that the command given by the SecOrch is valid for the one or more VNFs listed by the SecOrch, and the instructions on how to implement the command may also be read from the template database.

According to the determined network interfaces in block 104, a security instruction for the protection of the one or more VNFs may be issued, as shown in block 106. For example, the security instruction may indicate at least one of: instantiating at least one protector VNF, inserting at least one instantiated protector VNF, terminating at least one instantiated protector VNF, and removing at least one protector VNF. The network interfaces described herein may comprise various communication interfaces and/or communication links in the cloud environment.

In an exemplary embodiment, the security instruction may be issued to an orchestrator component such as ClOrch from the GOrch. The issued security instruction may comprise at least network routing related operation information. Thus, the ClOrch can instantiate or terminate certain protector VNFs according to the security instruction, and make the corresponding changes to VNF traffic forwarding paths based at least in part on the network routing related operation information, for example, inserting or removing some protector VNFs.

In accordance with an exemplary embodiment, the determined network interfaces in block 104 may comprise at least one of: network interfaces at which protector VNFs need to be placed, and network interfaces from which protector VNFs need to be removed. The protector VNFs described herein may comprise various security protector VNFs such as firewalls. Thus, the protection of the first VNF may be activated by placing protector VNFs at the determined network interfaces for the first VNF. Similarly, the protection of the second VNF may be deactivated by removing protector VNFs from the determined network interfaces for the second VNF.

The GOrch proposed in accordance with an exemplary embodiment may extend the existing security orchestration by providing the means to wrap topologically contiguous groups of VNFs with defined types of protection mechanisms. For example, the one or more VNFs as described with respect to FIG. 1 may comprise at least a group of topologically contiguous VNFs. The protection of this group of topologically contiguous VNFs may be performed by wrapping the group of topologically contiguous VNFs with protector VNFs. In an exemplary embodiment, the protector VNFs deployed for protecting this group of VNFs may be placed on network interfaces and/or communication links at the edge of the protected area within which this group of VNFs are located. Accordingly, a protection envelope may be formed by means of these protector VNFs so as to enclose the group of VNFs.

The GOrch proposed in accordance with an exemplary embodiment may be utilized for managing and monitoring security wrapping functionality for protected VNFs by protector VNFs. For example, the GOrch may monitor one or more protector VNFs instantiated for the protection of the one or more VNFs. Optionally, the GOrch may open listening interfaces for future incoming protector VNF messaging. In particular, the GOrch may receive reporting information (such as statistical information, alert information and/or the like) from the one or more protector VNFs. Additionally or alternatively, the GOrch may perform the centralized protector orchestration if it is needed and supported by the protector VNF. For example, the GOrch may instruct the one or more protector VNFs to take actions, based at least in part on the received reporting information.

In addition to protecting VNFs and monitoring protected VNFs, the proposed solution in accordance with an exemplary embodiment may also enable to cleanly re-instantiate the protected VNFs as required. For example, the one or more VNFs as described in connection with FIG. 1 may comprise at least a VNF aggregate formed by a first group of VNFs which may be interdependent in their functionalities. The VNF aggregate may comprise a so-called VNF service chain formed by the first group of VNFs as an independently pre-existing network topology, which may be guarded by using the proposed solution.

Accordingly, the GOrch proposed in accordance with an exemplary embodiment may monitor or observe a security violation or integrity of the VNF aggregate enclosed in a protection envelope which may be formed by wrapping the first group of VNFs with protector VNFs. The monitored or observed security violation may comprise, but is not limited to, failed run-time trust attestation, VNF traffic monitoring flagging anomalous traffic and/or the like.

In an exemplary embodiment, the GOrch may manage preparation of a second group of VNFs to replace the VNF aggregate upon the monitored security violation. The second group of VNFs may comprise an identical group of VNFs to the first group of VNFs for fast instantiation. For example, the second group of VNFs may be fully instantiated by interactions of the GOrch and the ClOrch, and interconnected in a manner identical to the connections of the first group of VNFs. As such, the second group of VNFs may act as the uncompromised service chain to be set up for taking the place of the original (compromised) VNF service chain.

In response to the monitored security violation, the GOrch may instantiate the second group of VNFs, and replace the VNF aggregate with the second group of instantiated VNFs. In response to the second group of instantiated VNFs taking the place of the VNF aggregate, the VNF aggregate (such as the compromised VNF service chain) may be terminated. Optionally, the terminated VNF aggregate may be analyzed for creating preventative measures against the monitored security violation (for example, against the malicious or accidental events which caused the security violation). In an exemplary embodiment, service interruption for traffic going through the compromised VNF service chain can be minimized by, for example, buffering incoming traffic while the uncompromised service chain is being set up. The compromised VNF service chain can be simply discarded, or for example, analyzed for inoculation of the re-instated VNF service chain.

Figure 2:
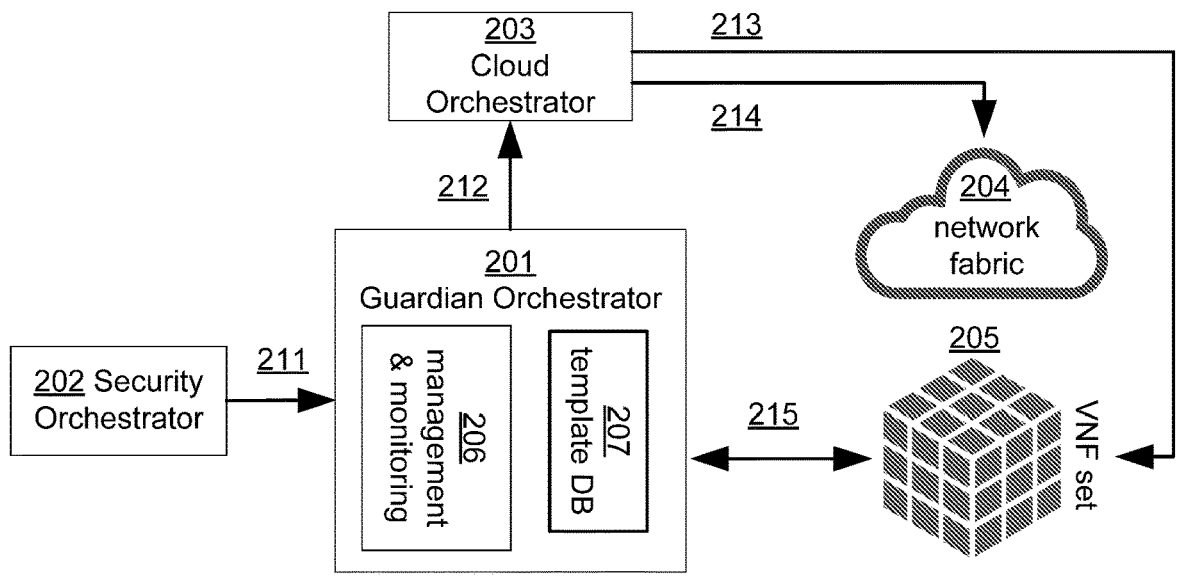
FIG. 2 exemplarily illustrates Guardian Orchestrator (GOrch) interactions in a network in accordance with an embodiment of the present disclosure.

FIG. 2 exemplarily illustrates GOrch interactions in a network in accordance with an embodiment of the present disclosure. The example described in connection with FIG. 2 is related to a use case where certain VNFs within the total set of VNFs (such as VNF set 205 shown in FIG. 2) is protected by "wrapping" their network interfaces with security-protector VNFs such as firewalls. This use case in accordance with exemplary embodiment may be applicable to a cloud environment or a system which may utilize the cloud technique. It will be realized that FIG. 2 merely schematically shows a basic sequence of interactions by an orchestration component such as GOrch 201 with some elements or components (such as SecOrch 202, ClOrch 203, network fabric 204 and VNF set 205 shown in FIG. 2) of the cloud network. Other possible interactions and/or components may also be conceived in view of the exemplary embodiments of the present disclosure.

The GOrch 201 may enable to provide an interface for the SecOrch 202 to activate/deactivate protections of a VNF or a group of VNFs, and an interface for the ClOrch 203 to facilitate network routing related operations and possible instantiation of protected/protector VNFs in the network. The interfaces to the GOrch 201 can support the related messaging from/to the SecOrch 202 and the ClOrch 203. The GOrch 201 may also extend templates in order to describe protection capabilities and their applicability to certain VNFs or classes of VNFs.

In an exemplary embodiment, the templating extensions related to functionality supported by the GOrch 201 may define at least one of: (i) security protection actions to be taken on instantiation/termination of a VNF, (ii) the security protection capability applicability to the VNF, (iii) the deployment method of security protection capabilities, and so on. While the exact details are implementation specific, in practise for case (i) the template definition could instruct the GOrch 201 that a certain VNF needs to be instantiated with additional firewall protection. For case (ii) an example could be that for a certain class of VNFs the protection functionalities of firewalling, honeypotting and/or malware analysis are applicable. For case (iii) the template could describe the resources and network connectivity required to set up a certain protective VNF function, for example, a malware analysis VNF might need a lot of CPU capacity and memory with certain kind of external connectivity to access signature databases.

The GOrch component such as GOrch 201, its external messaging, its internal extensions to existing VNF templating methods, the overall solution of protecting and monitoring the protected VNFs and optionally instructing protector VNFs will be described below in connection with FIG. 2.

As shown in FIG. 2, the SecOrch 202 may provide 211 a list of VNFs and a command instructing what to do with these VNFs, such as "GUARD" or "REMOVE GUARD" command. The "GUARD" command may be used to activate protection of a VNF (for example, by instantiating and inserting one or more protector VNFs), while the "REMOVE GUARD" command may be used to deactivate protection of a guarded VNF (for example, by terminating and removing the instantiated protector VNFs). Thus, the list of VNFs may comprise some VNFs which have been protected or need to be protected by the protector VNFs.

In response to the list of VNFs and the command from the SecOrch 202, the GOrch 201 may perform internal actions and instruct 212 the ClOrch 203 to manage the cloud environment accordingly. For example, a template database 207 may be checked in order to verify that the command given by the SecOrch 202 is valid for the listed VNFs, and the instructions on how to implement the command may also be read from the template database 207. In case that the command given by the SecOrch 202 is valid for the listed VNFs, the GOrch 201 can determine the relevant communications interfaces for activating/deactivating the protection of the listed VNFs. The determined communications interfaces may indicate some protector VNF insertion/removal points around the enclosed protected area for the listed VNFs based at least in part on network topology information.

When processing a "GUARD" command, a management and monitoring component 206 of the GOrch 201 may calculate the relevant communications interfaces where protector VNFs need to be placed based at least in part on network topology information. Alternatively or additionally, when processing a "REMOVE GUARD" command, the management and monitoring component 206 of the GOrch 201 may retrieve, for example from the stored state information, the relevant communications interfaces where protector VNFs have been placed previously based at least in part on network topology information, and thus be able to remove the guard without recalculation. The state information associated with the deployment of the protector VNFs may be stored such that the previous VNF security wrapping orchestration in the network can be maintained for facilitating execution of security instructions.

Many proper algorithms may be used to calculate the protector VNF insertion points. For example, a simple algorithm in pseudocode presented as below may be utilized to determine the network interfaces at which the protector VNFs may be placed.

VNFwrap = set of VNFs to protect
VNFwrap_I = set of all network interfaces of VNFwrap -continued for each VNF in VNFwrap:
    for each VNF_interface in VNF:
        if VNF_interface connects to interface in VNFwrap_I:
            do not place security protector VNF on link
        else:
            place security protector VNF on link In an exemplary embodiment, adding and removing of the security protection by the GOrch 201 are be fully reversible, in essence: RemoveGuard(Guard(x))=x. It will be appreciated that some complex algorithms can also be devised to calculate the protector VNF insertion points for cases where an efficient approach is required.

The GOrch 201 proposed in accordance with an exemplary embodiment can monitor security wrapping functionality for protected VNFs. For example, the management and monitoring component 206 of the GOrch 201 may open listening interfaces for (future) incoming messaging from the protector VNFs instantiated with the "GUARD" command. Alternatively or additionally, the management and monitoring component 206 may close listening interfaces for the protector VNFs terminated with the "REMOVE GUARD" command.

As shown in FIG. 2, the GOrch 201 may instruct 212 the ClOrch 203 about necessary actions for protector VNF instantiation and protector VNF insertion to VNF traffic forwarding paths, and/or for protector VNF termination and protector VNF removal from VNF traffic forwarding paths. Accordingly, the ClOrch 203 may instantiate and/or terminate 213 certain protector VNFs for the specified VNFs in the VNF set 205. In general, the protector VNFs which are instantiated or terminated may be located on the communications links at the edge of the protected area. With more complex scenarios, there could also be other VNFs elsewhere in the network which relate to the protection, for example, traffic aggregation machine learning. These VNFs may also be handled by the ClOrch 203 or other mechanism as required. Optionally, the ClOrch 203 may make some changes 214 to VNF traffic forwarding paths, for example, inserting and/or removing protector VNFs with respect to the network fabric 204.

According to an exemplary embodiment, some instantiated security protector VNFs may establish messaging links with the management and monitoring component 206 of the GOrch 201, and send statistical and/or alert information as defined by their functionalities. The management and monitoring component 206 may also directly instruct the security protector VNFs to take actions if such centralized protector orchestration is needed and supported by the security protector VNF. It will be realized that functionalities of the management and monitoring component 206 of the GOrch 201 may also be performed by separate components such as a management component and a monitoring component.

In addition to the solution of handling the basic protection functionality, exemplary embodiments in accordance with the present disclosure also encompasses a mechanism for protecting a VNF aggregate, monitoring it during operation and automatically re-instantiating it to a clean state on observed security violation.

Figure 3:
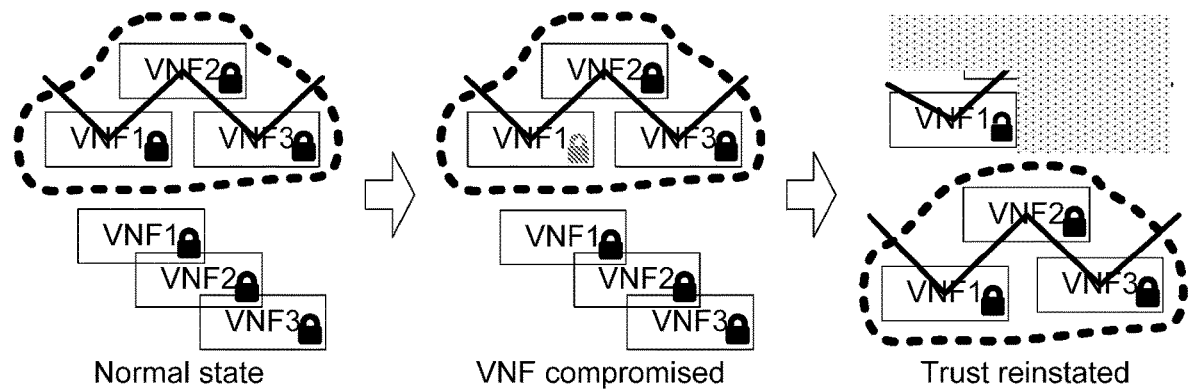
FIG. 3 exemplarily illustrates a run-time integrity protection mechanism in accordance with an embodiment of the present disclosure.

FIG. 3 exemplarily illustrates a run-time integrity protection mechanism in accordance with an embodiment of the present disclosure. The mechanism illustrated in connection with FIG. 3 can enable the GOrch to monitor sets of VNF functionality and dynamically replace compromised VNFs with clean VNFs or groups of VNFs performing the same function. As such, the proposed GOrch may provide a functionality of run-time integrity protection of the guarded VNFs, which can cleanly re-instantiate the protected VNFs in response to any integrity failure.

The example case may be split into three stages as shown in FIG. 3. In normal state, the protection envelope encloses a group of VNFs (shown as VNF1, VNF2 and VNF3 surrounded by a dashed ring in FIG. 3), which are likely to be in some manner interdependent in their functionalities, for example, they may form a so-called VNF service chain. In addition to this, the GOrch may manage the preparation of an identical group of VNFs for fast instantiation. These copied VNFs may be held on standby.

The GOrch may also monitor the integrity of the enclosed VNFs. For this any number of existing techniques such as Virtual Machine Introspection (VMI) can be used, or new techniques such as run-time attestation can be devised. In any case, the proposed solution in accordance with exemplary embodiments of the present disclosure may not be tied to any specific method of integrity monitoring. When a VNF (such as VNF1 as shown in FIG. 3) inside the protected envelope is compromised, or its integrity fails for some reason, the function performed by the whole VNF service chain is potentially at risk of failing or producing an unwanted malicious service.

In response to the detected integrity failure inside the protected area, the VNF copies held on standby may be fully instantiated by interactions of the GOrch and the ClOrch, and interconnected in a manner identical to the connections of the original VNFs. This results in the copied (uncompromised) VNF service chain taking the place of the original one. As such, trust of the VNF service chain can be re-instated. Service interruption for traffic going through the VNF service chain can be minimized by, for example, buffering incoming traffic while the uncompromised service chain is being set up. The original (compromised) VNF service chain may be simply discarded, or optionally analyzed for creating preventative measures against the malicious or accidental events which caused the integrity failure.

The various blocks or information flows shown in FIGS. 1-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
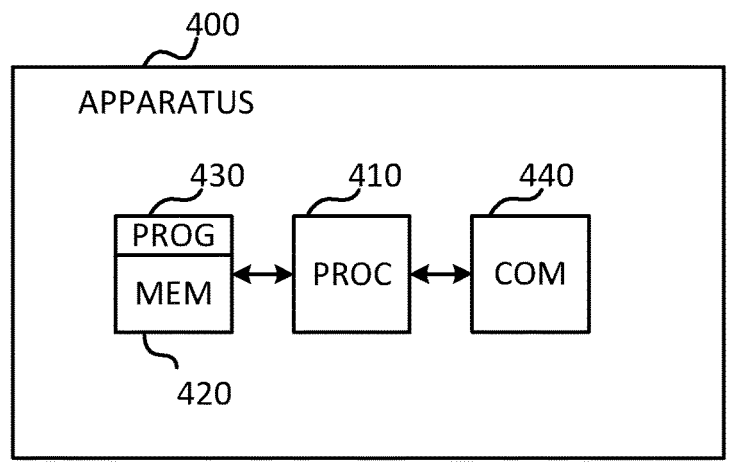
FIG. 4 is a simplified block diagram of an apparatus suitable for use in practicing exemplary embodiments of the present disclosure.

FIG. 4 is a simplified block diagram of an apparatus suitable for use in practicing exemplary embodiments of the present disclosure. The apparatus 400 shown in FIG. 4 may be configured to perform various operations and functions of the orchestration component according to exemplary embodiments as described in connection with FIGS. 1-3. Particularly, the apparatus 400 may be configured to function as the GOrch according to exemplary embodiments as described in connection with FIGS. 1-3.

The apparatus 400 may comprise a processor (PROC) 410, a memory (MEM) 420 which stores computer program codes (PROG) 430, and a suitable communication unit (COM) 440 (such as a transceiver, a receiver and/or a transmitter, optionally in communication with an antenna) for coupling or connecting to another apparatus such as a network entity, a communication node, a cloud component, a user equipment, a server, a client, a peripheral device, a database and so on. For example, the communication unit 440 may be configured to support the apparatus 400 to transmit/receive signals and messages to/from another apparatus. The processor 410 may be used for processing these signals and messages. In this example only one processor and one memory are shown in FIG. 4, but it will be appreciated that other examples may utilize more than one processor and/or more than one memory (for example, same or different processor/memory types).

The processor 410 may be embodied as various means for implementing the various functionalities of exemplary embodiments of the present disclosure comprising, for example, a microprocessor, a coprocessor, a controller, a general purpose computer, a special-purpose integrated circuit such as, for example, an Application Specific Integrated Circuit (ASIC), a Field Programmable Gate Array (FPGA), or a hardware accelerator, processing circuitry or the like. According to an exemplary embodiment, the processor 410 may be representative of a plurality of processors, or one or more multiple core processors, operating in concert. The processor 410 may, but need not, comprise one or more accompanying Digital Signal Processors (DSPs). In some exemplary embodiments, the processor 410 is configured to execute instructions stored in the memory device or instructions otherwise accessible to the processor 410. The processor 410 may be configured to operate such that the processor 410 causes the apparatus 400 to perform various functionalities described herein.

The memory 420 may be one or more computer-readable storage media that may comprise volatile and/or non-volatile memory. In some exemplary embodiments, the memory 420 comprises Random Access Memory (RAM) including dynamic and/or static RAM, on-chip or off-chip cache memory, and/or the like. Further, the memory 420 may comprise non-volatile memory, which may be embedded and/or removable, and may include, for example, read-only memory, flash memory, magnetic storage devices (for example, hard disks, floppy disk drives, magnetic tape, etc.), optical disc drives and/or media, non-volatile random access memory (NVRAM), and/or the like. The memory 420 may comprise a cache area for temporary storage of data. In this regard, at least a portion or the entire memory 420 may be included within the processor 410. Further, the memory 420 may be configured to store information, data, applications, computer-readable program code instructions, and/or the like for enabling the processor 410 and the apparatus 400 to carry out various functions in accordance with exemplary embodiments described herein. For example, the memory 420 may be configured to buffer input data for processing by the processor 410. Additionally or alternatively, the memory 420 may be configured to store instructions for execution by the processor 410.

The computer program codes 430 may be stored on a memory device, such as the memory 420, and executed by a processor, such as the processor 410, to enable the apparatus 400 to operate in accordance with the exemplary embodiments, as discussed above. That is, the exemplary embodiments of the present disclosure may be implemented at least in part by computer software executable by the processor 410, or by hardware, or by a combination of software and hardware. As will be appreciated, any such computer program codes may be loaded onto a computer or other programmable apparatus from a computer-readable storage medium to produce a particular machine, such that the particular machine becomes means for implementing the functions specified in the flowchart's block(s) or operation(s). These computer program codes may also be stored in a computer-readable storage medium that can direct a computer, a processor, or other programmable apparatus to function in a particular manner to thereby generate a particular machine or particular article of manufacture that becomes means for implementing the functions specified in the flowchart's block(s) or operation(s). The computer program codes may be retrieved from a computer-readable storage medium and loaded into a computer, processor, or other programmable apparatus to configure the computer, processor, or other programmable apparatus to execute operations to be performed on or by the computer, processor, or other programmable apparatus.

Alternatively or additionally, the apparatus 400 may comprise various means and/or modules for implementing functions of the foregoing steps and methods in FIGS. 1-3. In an exemplary embodiment, the apparatus 400 may serve as the GOrch as described with respect to FIG. 1 and comprise: obtaining means for obtaining security orchestration information for one or more VNFs; determining means for determining network interfaces relevant to protection of the one or more VNFs based at least in part on network topology information, in response to the security orchestration information; and issuing means for issuing a security instruction for the protection of the one or more VNFs, according to the determined network interfaces.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be realized by one of skills in the art, the functionality of the program modules may be combined or distributed as desired in various embodiments. In addition, the functionality may be embodied in whole or in part in firmware or hardware equivalents such as integrated circuits, FPGA, and the like.

Although specific embodiments of the disclosure have been disclosed, those having ordinary skills in the art will understand that changes can be made to the specific embodiments without departing from the spirit and scope of the disclosure. The scope of the disclosure is not to be restricted therefore to the specific embodiments, and it is intended that the appended claims cover any and all such applications, modifications, and embodiments within the scope of the present disclosure.

What is claimed is:

1. A method, comprising:
receiving a list of virtualized network functions at a security wrapping orchestration component within a cloud environment, wherein security wrapping protection is desired for the listed virtualized network functions;
determining network interfaces relevant to providing a protection envelope enclosing the listed virtualized network functions based at least in part on network topology information accesssible to the security wrapping orchestration component, wherein the network interfaces associated with the protection envelope are insertion points at which instantiations of security wrapping virtualized network functions would provide the listed virtualized network functions with security wrapping protection; and
issuing a security instruction from the security wrapping orchestration component to a cloud orchestration component within the cloud environment, wherein the security instruction requests instantiation and insertion of security wrapping virtualized network functions for the determined network interfaces associated with the protection envelope and corresponding changes to traffic forwarding paths in conjunction with the insertion of the security wrapping virtualized network functions at the determined insertion points.

2. The method according to claim I , wherein the list of virtualized network functions is received from a security orchestration within the cloud environment.

3. The method according to claim 1, further comprising:
verifying use of the security wrapping protection is valid for the listed virtualized network functions based at least in part on template information accessible to the security wrapping orchestration component; and
retrieving instructions on implementing the security wrapping protection for the listed virtualized network functions based at least in part on the template information.

4. The method according to claim 1, wherein the cloud orchestration component is configured to instantiate and insert the requested security wrapping virtualized network functions at the determined insertion points and change the traffic forwarding paths associated with the network interfaces to the list of virtualized network functions in response to the security instruction.

5. The method according to claim 4, the method further comprising:
monitoring the security wrapping virtualized network functions at the security wrapping orchestration component via messaging links between the security wrapping virtualized network functions and the security wrapping orchestration component; and
sending a message from the security wrapping orchestration component to at least one security wrapping virtualized network function instructing the at least one security wrapping virtualized network function to take an action based at least in part on the monitoring.

6. The method according to claim 4, the method further comprising:
receiving reporting information from the security wrapping virtualized network functions at the security wrapping orchestration component via messaging links between the security wrapping virtualized network functions and the security wrapping orchestration component; and sending a message from the security wrapping orchestration component to at least one security wrapping virtualized network function instructing the at least one security wrapping virtualized network function to take an action based at least in part on the reporting information.

7. The method according to claim 1, wherein the listed virtualized network functions include an aggregate group of virtualized network functions and a standby group of virtualized network functions, wherein security wrapping protection is desired for the aggregate group, where copies of the virtualized network functions in the aggregate group are desired to form the standby group;

wherein the network interfaces associated with the protection envelope are insertion points at which instantiations of the security wrapping virtualized network functions would provide the aggregate group of virtualized network functions with security wrapping protection;

wherein the security instruction requests at least partial instantiation of the copies of the virtualized network functions in the aggregate group to form the standby group;

wherein the cloud orchestration component is configured to instantiate the requested virtualized network functions to form the standby group in response to the security instruction.

8. The method according to claim 7, the method further comprising:

monitoring the security wrapping virtualized network functions at the security wrapping orchestration component via messaging links between the security wrapping virtualized network functions and the security wrapping orchestration component;

detecting an integrity failure within the aggregate group or a security violation of the protection envelope enclosing the aggregate group associated with at least one virtualized network function of the aggregate group; and issuing a second security instruction from the security wrapping orchestration component to the cloud orchestration component, wherein the second security instruction indicates the aggregate group is compromised and requests full instantiation and insertion of the standby group of virtualized network functions to replace the aggregate group and corresponding changes to traffic forwarding paths in conjunction with the insertion of the standby group at the determined insertion points;

wherein the cloud orchestration component is configured to fully instantiate and insert the standby group of virtualized network functions at the determined insertion points and change the traffic forwarding paths associated with the network interfaces to the standby group in response to the second security instruction.

9. The method according to claim 1, further comprising:

receiving a second list of virtualized network functions at the security wrapping orchestration component, wherein removal of security wrapping protection is desired for the second listed virtualized network functions; and issuing a second security instruction from the security wrapping orchestration component to the cloud orchestration component, wherein the second security instruction requests removal of security wrapping virtualized network functions from previously determined network interfaces associated with the second listed virtualized network functions and corresponding changes to traffic forwarding paths in conjunction with the removal of the security wrapping virtualized network functions.

10. An apparatus for a cloud environment, comprising:

at least one processor; and at least one memory including computer program code;

wherein the at least one memory and the computer program code are configured to, with the at least one processor, cause the apparatus at least to obtain a list of virtualized network functions, wherein security wrapping protection is desired for the listed virtualized network functions;

wherein the at least one memory and the computer program code are configured to, with the at least one processor, cause the apparatus at least to determine network interfaces relevant to providing a protection envelope enclosing the listed virtualized network functions based at least in pad on network topology information accessible to the apparatus, wherein the network interfaces associated with the protection envelope are insertion points at which instantiations of security wrapping virtualized network functions would provide the listed virtualized network functions with security wrapping protection;

wherein the at least one memory and the computer program code are configured to, with the at least one processor, cause the apparatus at least to issue a security instruction to a cloud orchestration component within the cloud environment, wherein the security instruction requests instantiation and insertion of security wrapping virtualized network functions for the determined network interfaces associated with the protection envelope and corresponding changes to traffic forwarding paths in conjunction with the insertion of the security wrapping virtualized network functions at the termined insertion points.

11. The apparatus according to claim 10, wherein the list of virtualized network functions is obtained from a security orchestration within the cloud environment.

12. The apparatus according to claim 10, wherein the at least one memory and the computer program code are configured to, with the at least one processor, cause the apparatus at least to verify use of the security wrapping protection is valid for the listed virtualized network functions based at least in part on template information accessible to the apparatus;

wherein the at least one memory and the computer program code are configured to, with the at least one processor, cause the apparatus at least to retrieve instructions on implementing the security wrapping protection for the listed virtualized network functions based at least in part on the template information.

13. The apparatus according to claim 10, wherein the listed virtualized network functions include a group of topologically contiguous virtualized network functions.

14. The apparatus according to claim 10, wherein the cloud orchestration component is configured to instantiate and insert the requested security wrapping virtualized network functions at the determined insertion points and change the traffic forwarding paths associated with the network interfaces to the list of virtualized network functions in response to the security instruction.

15. The apparatus according to claim 14, wherein the at least one memory and the computer program code are configured to, with the at least one processor, cause the apparatus at least to monitor the security wrapping virtualized network functions via messaging links between the security wrapping virtualized network functions and the apparatus;
  wherein the at least one memory and the computer program code are configured to, with the at least one processor, cause the apparatus at least to send a message to at least one security wrapping virtualized network function instructing the at least one security wrapping virtualized network function to take an action based at least in part on the monitoring.

16. The apparatus according to claim 14, wherein the at least one memory and the computer program code are configured to, with the at least one processor, cause the apparatus at least to receive reporting information from the security wrapping virtualized network functions via messaging links between the security wrapping virtualized network functions and the apparatus;
  wherein the at least one memory and the computer program code are configured to, with the at least one processor, cause the apparatus at least to send a message to at least one security wrapping virtualized network function instructing the at least one security wrapping virtualized network function to take an action based at least in part on the reporting information.

17. The apparatus according to claim 10, wherein the listed virtualized network functions include an aggregate group of virtualized network functions and a standby group of virtualized network functions, wherein security wrapping protection is desired for the aggregate group, where copies of the virtualized network functions in the aggregate group are desired to form the standby group;
  wherein the network interfaces associated with the protection envelope are insertion points at which instantiations of the security wrapping virtualized network functions would provide the aggregate group of virtualized network functions with security wrapping protection;
  wherein the security instruction requests at least partial instantiation of the copies of the virtualized network functions in the aggregate group to form the standby group;
  wherein the cloud orchestration component is configured to instantiate the requested virtualized network functions to form the standby group in response to the security instruction.

18. The apparatus according to claim 17, wherein the at least one memory and the computer program code are configured to, with the at least one processor, cause the apparatus at least to monitor the security wrapping virtualized network functions via messaging links between the security wrapping virtualized network functions and the apparatus;
  wherein the at least one memory and the computer program code are configured to, with the at least one processor, cause the apparatus at least to detect an integrity failure within the aggregate group or a security violation of the protection envelope enclosing the aggregate group associated with at least one virtualized network function of the aggregate group;
  wherein the at least one memory and the computer program code are configured to, with the at least one processor, cause the apparatus at least to issue a second security instruction to the cloud orchestration component, wherein the second security instruction indicates the aggregate group is compromised and requests full instantiation and insertion of the standby group of virtualized network functions to replace the aggregate group and corresponding changes to traffic forwarding paths in conjunction with the insertion of the standby group at the determined insertion points;
  wherein the cloud orchestration component is configured to fully instantiate and insert the standby group of virtualized network functions at the determined insertion points and change the traffic forwarding paths associated with the network interfaces to the standby group in response to the second security instruction.

19. The apparatus according to claim 10, wherein the at least one memory and the computer program code are configured to, with the at least one processor, cause the apparatus at least to obtain a second list of virtualized network functions, wherein removal of security wrapping protection is desired for the second listed virtualized network functions;
  wherein the at least one memory and the computer program code are configured to, with the at least one processor, cause the apparatus at least to issue a second security instruction to the cloud orchestration component, wherein the second security instruction requests removal of security wrapping virtualized network functions from previously determined network interfaces associated with the second listed virtualized network functions and corresponding changes to traffic forwarding paths in conjunction with the removal of the security wrapping virtualized network functions.

20. A non-transitory computer-readable medium comprising program instructions for causing a security wrapping orchestration component for a cloud environment to perform at least the following:
  receiving a list of virtualized network functions, wherein security wrapping protection is desired to the listed virtualized network functions;
  determining network interfaces relevant to providing a protection envelope enclosing the listed virtualized network functions based at least in part on network topology information accessible to the security wrapping orchestration component, wherein the network interfaces associated with the protection envelope are insertion points at which instantiations of security wrapping virtualized network functions would provide the listed virtualized network functions with security wrapping protection; and
  issuing a security instruction to a cloud orchestration component within the cloud environment, wherein the security instruction requests instantiation and insetion of security wrapping virtualization network functions for the determined network interfaces associated with the protection envelope and corresponding changes to traffic forwarding paths in conjunction with the insertion of the security wrapping virtualized network functions at the determined insertion points.

* * * * *